Figure 1:
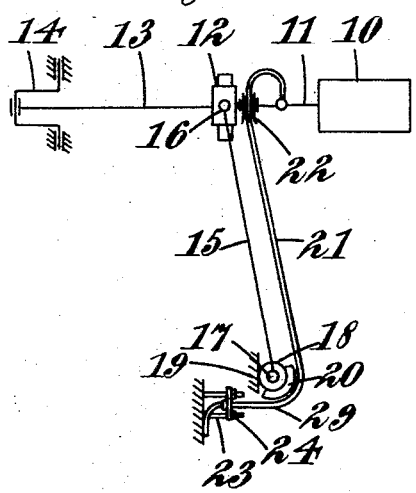

July 11, 1933. K. O. KELLER 1,917,590
MEANS FOR CONDUCTING FLUIDS TO RECIPROCATING PARTS OF MACHINERY Filed Jan. 6, 1933

INVENTOR
Karl Otto Keller
By Byrnes, Stebbins,
Parmelee & Slenko
Attorneys

Patented July 11, 1933

1,917,590

UNITED STATES PATENT OFFICE

KARL OTTO KELLER, OF SUNDERLAND, ENGLAND, ASSIGNOR TO WILLIAM DOXFORD & SONS LIMITED, OF SUNDERLAND, ENGLAND, A BRITISH COMPANY

MEANS FOR CONDUCTING FLUIDS TO RECIPROCATING PARTS OF MACHINERY

Application filed January 6, 1933, Serial No. 650,461, and in Great Britain February 19, 1932.

The present invention consists of improvements in or relating to means for conducting fluids to reciprocating parts, and is particularly applicable, though not limited to, means for conveying water to the pistons of internal combustion engines for cooling them.

Heretofore this has been effected either by telescopic tubes or by a system of rigid tubes pivotally connected together end to end to permit of relative angular movement, the other ends of these tubes being pivotally connected respectively to a reciprocating part and to a fixed part of the mechanism. It has also been proposed to use a flexible tube wound on a spring-controlled drum, but this also required a rotatable pipe joint on the axis of the drum. The object of the present invention is to provide an improved construction which avoids the necessity for using rigid liquid-carrying tubes, and sliding, rotating or pivotal joints therefor.

According to the present invention there is provided in a machine having a reciprocating part, means for conducting a fluid to said part comprising a floating guide, a flexible tube which passes round the guide and has one end secured to the reciprocating part and the other to a stationary part, and means to control the bodily movement of the guide to keep the tube taut.

According to another feature of the invention, the said means may comprise the combination with a rigid link anchored at its ends to the reciprocating part and a fixed part of the mechanism respectively and extending substantially at right-angles to the direction of motion of the reciprocating part, one of said anchorages permitting movement of that end of the link in a direction substantially at right-angles to the direction of reciprocation, of curved guides on the ends of said link, and a flexible tube having one end fixed to the reciprocating part, extending along said link and around said guides, and having its other end fixed to the stationary part of the machine.

Where a rubber tube is employed, the anchorage at one end of it may be made adjustable in order to adjust the initial tensioning of the tube. The adjustment will be effected in accordance with the speed of acceleration, that is to say, the higher the speed the greater will be the tension of the tube necessary to prevent undue oscillations.

In order that the invention may be more readily understood, some specific examples will now be described with reference to the accompanying diagrams which illustrate alternative embodiments of the invention.

Like reference numerals indicate like parts throughout the drawing.

Figure 1 shows a piston 10 connected by a piston rod 11 to a crosshead 12 and provided with a connecting rod 13 connecting it to a crank 14.

A link 15 has one end 16 pivoted to the crosshead and the other end 17 pivoted to a roller 18 which rolls upon a fixed guide 19 and also pivoted to a pulley 20. A flexible pipe 21 for cooling liquid has one end secured to an anchorage 22 fixed in relation to the crosshead. The anchorage is of trumpet formation to prevent sharp bending of the pipe. From this anchorage the pipe extends parallel to the link 15 and passes round the pulley 20 to a fixed anchorage 23. The pulley 20 is not a complete circle but only of such circumferential extent as is required for the angle between the two portions 21 and 29 of the pipe.

It will be seen that the link 15 is substantially perpendicular to the axis of the piston when the latter is in the middle of its stroke. By this means the movement of its end 17 is reduced to a minimum. Further, the part of the tube 29 between the pulley and the fixed anchorage is substantially perpendicular to the direction of movement of the end 17 of the link, whereby the stretching of this part of the tube is negligible.

The anchorage 23 is illustrated diagrammatically as being secured by a pair of nuts 24 by adjusting which the initial tensioning of the tube may be adjusted to suit the accelerations to which it will be subjected.

Figure 2:
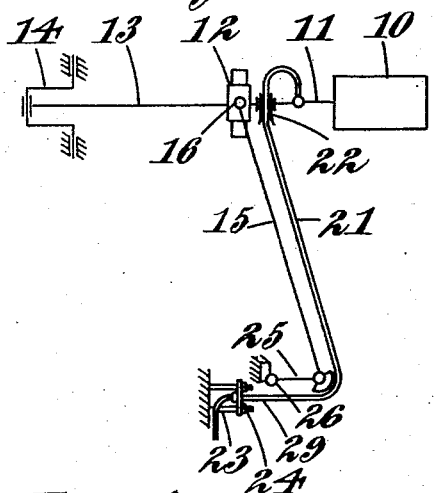

The arrangement shown in Figure 2 is the same as that shown in Figure 1 except that the end 17 of the link 15, instead of being controlled by a roller on a fixed guide is pivoted to a link 25 of which the other end is mounted in a fixed pivot 26. By this arrangement variations in the stretching of the tube due to the reciprocating movement can be completely avoided.

Figure 3:
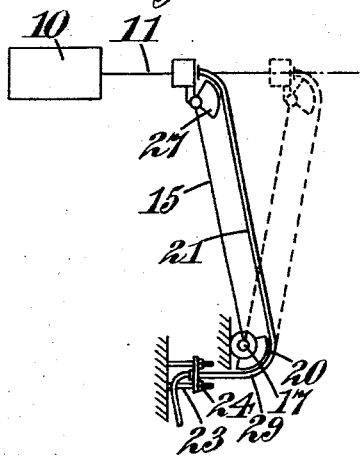

The arrangement shown in Figure 3 is the same as that shown in Figure 1 except that instead of being secured to the anchorage 22 the tube is passed round a pulley 27 similar to the pulley 20.

Figure 4:
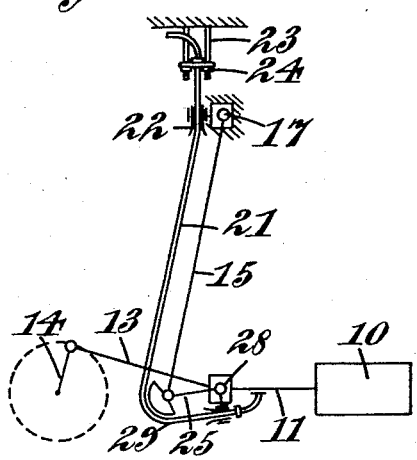

The arrangement shown in Figure 4 is an inversion of that shown in Figure 2 in that the link 25 is pivoted to the crosshead at 28 and the end 17 of the link 15 is mounted in a fixed pivot.

It will be appreciated that the drawing is purely diagrammatic. In practice, in an engine of the type having two pistons of which the upper piston rod is connected to a transverse beam the pipe 21 and link 15 might lie alongside this beam, the pulley 27 of Figure 3 being secured to one end of the beam and the guide 19 being afforded by a fixed part near the other end of the beam.

I claim:—

1. In a machine the combination of a reciprocating part whereto a fluid is to be supplied, a flexible tube connected at one end to said reciprocating part and at the other end to a fixed part of the machine, a floating guide engaging said tube and means controlling the movement of said guide whereby it maintains said tube taut.

2. In a machine the combination of a reciprocating part whereto fluid is to be supplied, a flexible tube connected at one end to said reciprocating part and at the other end to a stationary part of the machine, a guide-member movable in a direction substantially at right-angles to the path of reciprocation of said part, and engaging said tube, and means controlling the movement of said guide so that it maintains said flexible tube taut.

3. In a machine the combination of a reciprocating part whereto fluid is to be supplied, a flexible tube connected at one end to said reciprocating part and at the other end to a stationary part of the machine, a rigid link anchored at its ends to the said reciprocating part and stationary part respectively, one of said anchorages permitting movement of its end of the link in a direction substantially at right-angles to the path of reciprocation of the moving part, and a guide carried on the last-mentioned end of said link, engaging said flexible tube.

4. In a machine the combination of a reciprocating part whereto a fluid is to be supplied, a flexible tube connected at one end to said reciprocating part and at the other end to a fixed part of the machine, a floating guide engaging said tube, means controlling the movement of said guide whereby it maintains said tube taut, and means at one end of said flexible tube for adjusting the tension thereof.

5. In an internal-combustion engine, the combination of a piston whereto a cooling liquid is to be supplied, a rigid link pivotally engaged at one end with a part moving with said piston and extending laterally from the path of movement of said piston, a roller on the other end of said link, a track whereon said roller moves, extending at right-angles to the path of said piston, a guide-member carried on said link near said roller, a flexible tube having one end communicating with said piston, lying along said link and around said guide-member, an anchorage on a fixed part of the engine for the second end of said tube and means at said anchorage for applying tension to said tube.

In testimony whereof I affix my signature.

KARL OTTO KELLER.